Aug. 31, 1943.　　　A. L. SIMISON　　　2,328,302
METHOD OF MAKING PARALLEL FIBER FILTERS
Filed Aug. 30, 1940
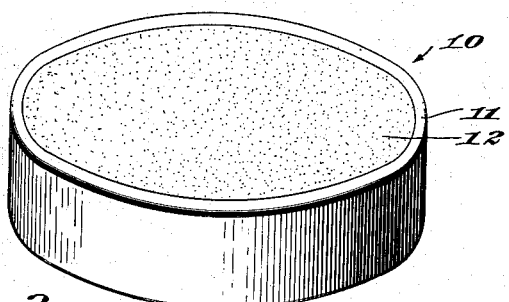
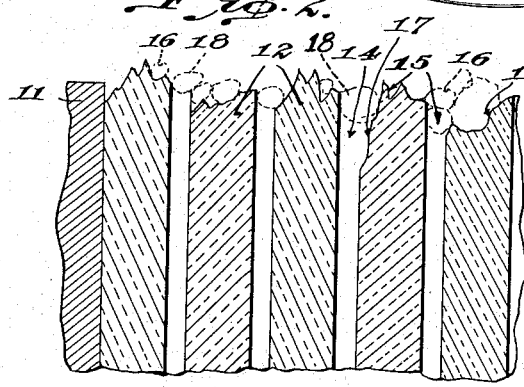
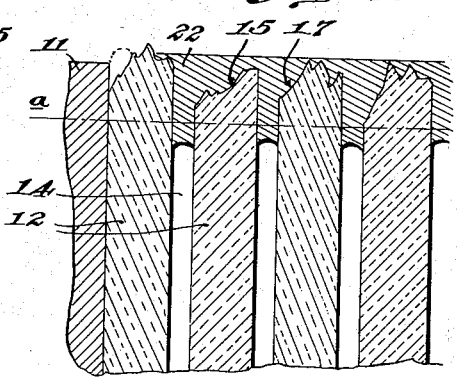
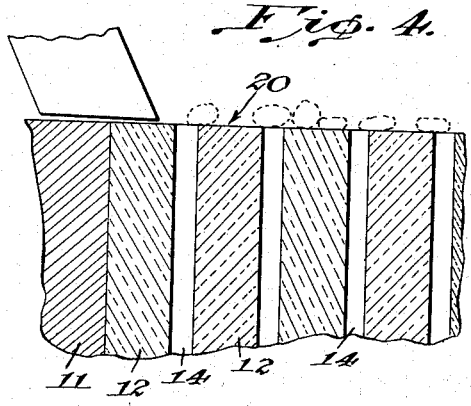
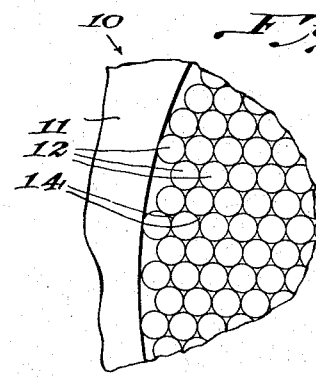
INVENTOR
A. L. Simison,
BY
ATTORNEY Patented Aug. 31, 1943

2,328,302

UNITED STATES PATENT OFFICE 2,328,302

METHOD OF MAKING PARALLEL FIBER FILTERS

Allen L. Simison, Newark, Ohio, assignor to Owens-Corning Fiberglas Corporation, a corporation of Delaware Application August 30, 1940, Serial No. 354,852

8 Claims. (Cl. 183—44)

The present invention relates to filters, particularly to filters formed of closely packed parallel glass fibers and to a method of making such filters.

In parallel fiber filters, a plurality of fibers, usually circular in cross section, are fagotted to form a bundle wherein the fibers are substantially in longitudinal contact and extend in the direction of flow of the filtrate. The filter interstices are formed by the spaces between the fibers at the sides of the longitudinal lines of contact between adjoining fibers. The fibers are maintained in compact relation by suitable means, for example, a band or frame of suitable material that encloses the bundle. Filters of this general type are shown, for instance, in the Swiss Patent 129,574 of 1929, and in the U. S. Patent 1,885,762 to Polushkin, November 1, 1932.

These filter units are placed in fluid passages or are employed, as illustrated in the above mentioned patents, in special filtering equipment in a manner so that fluid to be filtered is directed through the units, the filtered out particles of material being deposited on the face of the unit. After a predetermined amount of filtered out material has been deposited on the face, the filter unit is cleaned by scraping off the deposited material, by flushing the material away by forcing fluid through the filter in the reverse direction to filtrate flow, by a combination of the two methods, or by other suitable means.

These filter units are most commonly made by first providing a bundle of parallel fibers of desired length and then cutting the bundle of fibers transversely to form a plurality of slabs. The cutting is usually performed by means of a saw or other tool and the marks left by the cutting result in uneven surfaces on the unit. Further, the glass fibers are split and chipped at their ends and broken off at different lengths by the cutting operation. This contributes further to the unevenness of the surface. It has been attempted to grind the faces of these units, but the grinding chipped and split the ends of the fibers and resulted in an uneven surface that resembled ground glass in appearance.

Difficulty is encountered in cleaning these filter units since particles of material deposited on the rough face thereof lodge in the crevices and irregularities present on the face. The chipped ends of the fibers result in widening of the filter interstices at their mouth so that particles lodge in these widened mouths and block up the interstices and interfere with filtering action.

It is an object of the present invention to provide a filter unit of parallel glass fibers that is easily cleaned and that has a smooth regular filtering surface and in which the end faces of the individual fibers are substantially all located in a single true plane. The deposited material is easily removed from such a surface by simple scraping means.

It is another object of the present invention to produce a parallel glass fiber filter having interstices or pores of uniform cross section throughout their length so that filtered out particles are deposited on the true surface of the unit and are prevented from lodging in the pores.

It is a further object to provide an improved efficient method for producing filter units having these desirable characteristics.

Other objects and advantages of the invention will appear from the following description.

In the drawing:

Figure 1 is a perspective view of an exemplifying filter unit to which the present invention is directed.

Figure 2 is a greatly enlarged fragmentary sectional view of the same showing the condition of the fibers after the cutting off or other forming operation.

Figure 3 is a similar view of a filter unit illustrating a preferred disposition of backing-up material in the filter interstices in accordance with the present invention.

Figure 4 is a similar view of a filter unit finished in accordance with the present invention.

Figure 5 is a fragmentary plan view of the same.

The filter unit 10 comprises a circular frame 11 but which may be rectangular or of other configuration. The frame encloses a multiplicity of glass fibers 12 extending transversely to the plane of the open face of the frame. The fibers may be straight or curved as desired. The cross-sectional size of the fibers is suited to the material to be filtered, the size of the fibers controlling the size of the interstices or pores of the filter. Fine glass fibers of from about .0002 to .030 inch, more or less as desired, may be employed. Filters thus constructed have pores of extremely small size, and are capable of filtering out particles of a size as small as approximately 1 micron, or smaller.

The fibers are assembled into a bundle of desired length which is then sheathed in a cylinder or tube of glass, metal or other suitable material. The sheathed bundle is then cut by means of a saw, or the like, transversely into a plurality of slabs to form filter units each comprising a framed bundle of closely packed, parallel fibers extending transversely to the major faces of the unit.

Although the units are most efficiently made as above described, they may be formed individually of bundles of parallel fibers of a length substantially equal to the desired thickness of the completed unit. In this method the fibers are broken or cut into the required length prior to their assembly into the bundle.

Filter units made as above described had a rough and irregular surface. The fibers were broken off at different lengths and the ends were split and chipped, making it difficult to remove many types of material from the face of the unit. Further, the chipped ends formed irregularly shaped mouths at the ends of the interstices between the fibers in which particles lodged.

The present invention provides an efficient method for producing a filter unit in which the end faces of the fibers are true flat finished surfaces located in a single plane to insure ease of cleaning. The ends of the fibers have regular and uniform outlines corresponding to the true cross-sectional configuration of the fibers so that the filter interstices are of constant and uniform cross-sectional area throughout the thickness of the unit. Filtered out particles will be deposited on the true surface of the unit and prevented from partially entering the interstices to block up the pores of the filter.

As illustrated in Figure 2 of the drawing, the fibers 12 have interstices 14 therebetween which act as the pores of the filtering unit. As heretofore made, there were crevices 15 formed by adjoining fibers of unequal length and by the cracks and the irregularities in the end faces of the fibers. Solid particles such as 16 were deposited in these crevices. The chipped ends of the fibers created widened mouths 17 for some of the interstices in which particles of filtered out material such as 18 tended to lodge and obstruct the interstices.

In accordance with the present invention, the filter unit after being cut off is finished on at least its filtering face to a true plane in which substantially all the fiber ends are located. The fiber ends themselves are finished to true flat surfaces 20 of regular outline conforming to the cross-sectional configuration and size of the fibers, so that the interstices are of uniform cross-section throughout their lengths.

The finishing may be accomplished by grinding or by other suitable method. It may be performed in a series of steps, each step employing progressively finer abrasives. The filter units, either singly or in groups, are held to the bed of a usual polishing machine and a flat buffer disk of woven material is rotated while being passed back and forth over the faces of the units. The buffer may be charged with finely divided abrasive such as carborundum, or the like, and the polishing may proceed in a series of steps, each succeeding step employing a finer abrasive than the preceding one. The final step may be accomplished by means of a buffer charged with rouge or other extremely fine abrasive material.

If desired, the first part of the finishing operation may be carried out by grinding the faces of the unit by means of a usual grinding wheel of suitable grain size or by employing, successively, wheels of progressively finer grain size, the final finishing or polishing operation being effected as heretofore described. Satisfactory results have been obtained by performing the entire finishing operation by means of grinding wheels of suitable grain size.

During finishing and polishing, the fibers, at least at their end portions, are backed up and supported so that the end faces of the fibers may be polished to a true flat surface while the fibers are held rigidly and prevented from splitting and chipping. For this purpose, the interstices are filled, at least in their end portions, prior to the finishing operation with a rigid material 22 (Figure 3) that surrounds each fiber at its end. The units are then finished on their surfaces to an extent, as represented by the broken line $a$ in Figure 3, at which substantially all irregularities are removed and substantially all the fiber ends are finished down to true flat surfaces lying in a single plane.

The rigid backing up material 22 is preferably one that may be introduced into the interstices while in fluid form and subsequently solidified, such a material being particularly effective in obtaining the desired penetration into the small interstices. It should also be capable of returning to fluid form under the action of heat or under chemical action, or adapted to be dissolved out of the interstices by suitable solvents or removed by chemical action to provide ease in its removal after the polishing operation. The material may be one that is liquid at or near ordinary temperatures and that will solidify upon temperature change, for instance, upon lowering of the temperature. In this case subsequent raising of the temperature will cause liquefaction of the backing-up material to allow its removal.

One material found to be particularly suited to the purposes of the present invention is Canadian balsam. This material may be rendered highly fluid under the action of heat and the unit immersed therein for a sufficient length of time to permit entry of the fluid into the spaces between the fibers. Upon removal of the treated unit from the bath of balsam and cooling thereof, the balsam solidifies to form a rigid backing-up material surrounding each fiber to support the fibers during finishing. By completely surrounding each fiber at its end the fibers are prevented from chipping and splitting.

The filling of the interstices with the rigid material also prevents small particles of abrasive from entering or being forced into the spaces between the fibers. If the rigid backing-up material does have any abrasive particles embedded therein by the finishing action, these particles will be removed upon removal of the backing-up material.

The length of time that the units are immersed in the bath will vary for filter units of different size fibers but in every case they should remain in the bath a time sufficient to obtain penetration of the balsam into the interstices between the fibers to a measurable degree. Penetration of the balsam to a depth of approximately one-sixteenth inch or less may be sufficient in most instances but penetration to a greater depth may be obtained if desired. The process is most efficiently carried out by introducing only sufficient solid material into the interstices to obtain the necessary backing-up of the filaments thereby holding to a minimum the amount of treatment required to remove the solid material. Care should be taken to maintain the balsam bath at the temperature at which it is highly fluid but not to heat it excessively since the resulting increase in consistency will cause difficulty in obtaining the desired penetration of the material into the interstices.

After polishing, the balsam is removed by suitable means either by reheating or, preferably, by dissolving it out with a solvent. One such solvent found to be particularly efficient is xylol, but others such as ether, chloroform, toluene, etc., of course, may be employed.

The backing-up material may be in the form of a wax applied while heated and in liquid form to the interstices and subsequently hardened. Removal of the wax after polishing is effected by heating the filtering unit, the heating being carried to a point causing volatilization of the wax if required. Where organic compounds, for instance, pitch, asphalt, phenol formaldehyde, etc., are employed in the same capacity, their removal is accomplished by heating the polished unit to a temperature at which the organic backing-up material will burn out in the presence of oxygen. Alternatively, such materials can be removed by treating the unit after polishing with a corrosive oxydizing compound. Thus, phenol formaldeyhyde and other organic backing-up materials can be removed by means of a nitric acid and potassium chloride solution without deleterious effect on the glass fibers.

Other modifications and changes within the scope of the appended claims will suggest themselves to one skilled in the art.

I claim:

1. The method of making filter units formed of a multiplicity of fine glass fibers which comprises, arranging the fibers in parallelism and in longitudinal contact to form a bundle of fagotted fibers with the spaces between the fibers forming passages extending lengthwise of the fibers, cutting said bundle transversely into a plurality of filter units, introducing a substantially rigid backing-up and supporting material into said passages to surround each fiber at least at its end portions, grinding a filtering face of said unit while the fibers are supported by the backing-up material, and removing said backing-up material.

2. The method of making filter units formed of a multiplicity of fine glass fibers which comprises, arranging the fibers in parallelism and in longitudinal contact to form a filter unit of fagotted fibers with the spaces between said fibers forming filtering passages extending lengthwise of the fibers, introducing a substantially rigid backing-up and supporting material into at least the end portions of said passages to surround each fiber at least at its end portions, grinding said unit on at least one of its filtering faces to finish said face while the fibers are supported by the backing-up material, and removing said backing-up material.

3. The method of making filter units formed of a multiplicity of fine glass fibers which comprises, arranging the fibers in parallelism and in longitudinal contact to form a bundle of fagotted fibers, the spaces between said fibers forming passages extending lengthwise of said fibers, cutting said bundle transversely into a plurality of filter units, immersing said unit in a bath of liquefied solid material to cause the liquid to penetrate the passages at least in their outer portions, removing the unit from the bath and solidifying the material in the passages to provide a substantially rigid backing-up and supporting material surrounding each fiber at least at its end portions, grinding said unit on at least its filtering face while the fibers are supported by the backing-up material, and removing said backing-up material.

4. The methods of making filter units formed of a multiplicity of fine glass fibers which comprises, arranging the fibers in parallelism and in longitudinal contact to form a unit of fagotted fibers, the spaces between the fibers forming passages extending lengthwise of the fibers, immersing said unit in a bath of liquefied solid material to cause the material to penetrate the spaces between the fibers at least in their outer portions, solidifying the liquid in the passages to form a substantially rigid backing-up and supporting material surrounding each fiber at least at its end portions, grinding said unit on at least its filtering face while the fibers are supported by the backing-up material, and removing said backing-up material.

5. The method of making filter units formed of a multiplicity of fine glass fibers which comprises, arranging the fibers in parallelism and in longitudinal contact to form a bundle of fagotted fibers, wherein the spaces between the fibers provide passages extending lengthwise of the fibers, cutting said bundle transversely into a plurality of filter units, immersing a unit in a bath of Canadian balsam heated to the point of liquefaction to cause the balsam to penetrate the filter passages at least in their outer portions, removing the unit from the bath and allowing it to cool so that the balsam will solidify and form a substantially rigid backing-up and supporting material surrounding each fiber at least at its end portions, grinding said unit on at least its filtering face while the fibers are supported by the backing-up material, and dissolving said backing-up material by means of a solvent to remove it from the passages in the unit.

6. In a method of making filter members formed of a plurality of fine glass fibers, the steps of arranging the fibers in parallelism and in longitudinal contact to form a filter member of fagotted fibers with the spaces between the fibers forming filtering passages extending lengthwise of the fibers, treating said member with a flowable material and causing the material to penetrate the spaces between the fibers at least in their end portions to surround each fiber, converting the material in said spaces to a rigid state to support the ends of the fibers, grinding said member on one of its faces while the material is rigid and the strands are supported thereby, and removing said material.

7. The method of making filter units formed of a multiplicity of fine glass fibers which comprises, arranging the fibers in parallelism and in longitudinal contact to form a bundle of fagotted fibers, the spaces between said fibers forming passages extending lengthwise of said fibers, immersing said unit in a bath of liquefied solid material to cause the liquid to penetrate the passages at least in their outer portions, removing the unit from the bath and solidifying the material in the passages to provide a substantially rigid backing-up and supporting material surrounding each fiber at least at its end portions, grinding said unit on at least its filtering face while the fibers are supported by the backing-up material, and removing said backing-up material.

8. A method of making filter members composed of a plurality of fine glass fibers, which comprises forming a bundle of fibers in which the fibers are arranged in parallelism and in longitudinal contact with the spaces between the fibers forming filtering passages extending lengthwise of the fibers and having a rigid material disposed in the passages and filling at least the outer end portions thereof, grinding an end face of said bundle to smooth the ends of said fibers, and thereafter removing the rigid material from said passages.

ALLEN L. SIMISON.